US006630041B1

(12) United States Patent
Reiber

(10) Patent No.: US 6,630,041 B1
(45) **Date of Patent: *Oct. 7, 2003**

(54) PROCESS AND MATRIX FOR LAYING SMALL DECORATIVE TILE

(76) Inventor: Craig Reiber, 5167 Finehill, La Crescenta, CA (US) 91214

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 850 days.

(21) Appl. No.: 08/818,333

(22) Filed: Mar. 14, 1997

(51) Int. Cl.[7] .......... B32B 31/00

(52) U.S. Cl. .......... 156/71; 156/63; 52/744.11; 52/744.12; 52/745.2; 52/391; 52/449; 52/388; 52/389

(58) Field of Search .......... 156/63, 71; 52/745.2, 52/744.11, 744.12, 391, 449, 389, 388; 33/526, 527

(56) References Cited

U.S. PATENT DOCUMENTS 712,168 A * 10/1902 Worth .......... 52/388
738,704 A * 8/1903 Semmer
763,064 A * 6/1904 Mercer .......... 52/389
1,359,893 A * 11/1920 Hopkins
2,844,955 A * 7/1958 Talbott .......... 52/744.11
2,852,932 A * 9/1958 Cable .......... 33/526
2,931,751 A * 4/1960 Fresne .......... 52/388
3,496,694 A * 2/1970 Hicks et al.
3,775,856 A * 12/1973 Schmidt .......... 33/DIG. 20 X
3,982,876 A * 9/1976 Eisenbach .......... 264/261
4,712,309 A * 12/1987 Kingston et al. .......... 33/527
4,851,073 A * 7/1989 Satou .......... 156/516
5,459,938 A * 10/1995 Knight et al. .......... 33/526
5,568,391 A * 10/1996 Mckee .......... 364/469.01

* cited by examiner

*Primary Examiner*—Jeff H. Aftergut
(74) *Attorney, Agent, or Firm*—John E. Wagner; Robert C. Smith

(57) ABSTRACT

A process for laying small decorative tiles on a surface includes the use of a lightweight plastic matrix having ridges of a desired pattern which are used to locate and space the tiles of different shapes in the desired locations. Tiles of the desired color and shape are placed face down on the matrix. A perforated paper matrix having an adhesive layer is then placed over the exposed back sides of the tiles to maintain their relative positions. The surface to be tiled is then coated with thinset adhesive and the tile strip with the matrix is removed and placed against the surface. Several such tile strips may be placed side-by-side or in a desired arrangement on the surface after which grout is applied between the tiles in a well known manner. The process for producing the paper matrix is also described.

9 Claims, 3 Drawing Sheets

FIG. 4
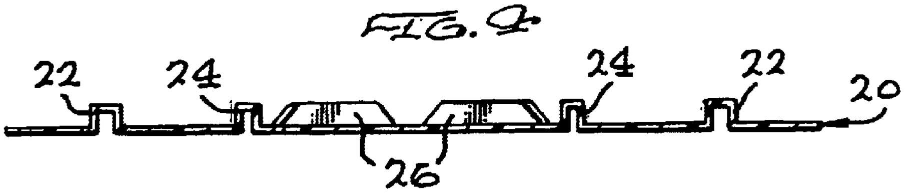
FIG. 5
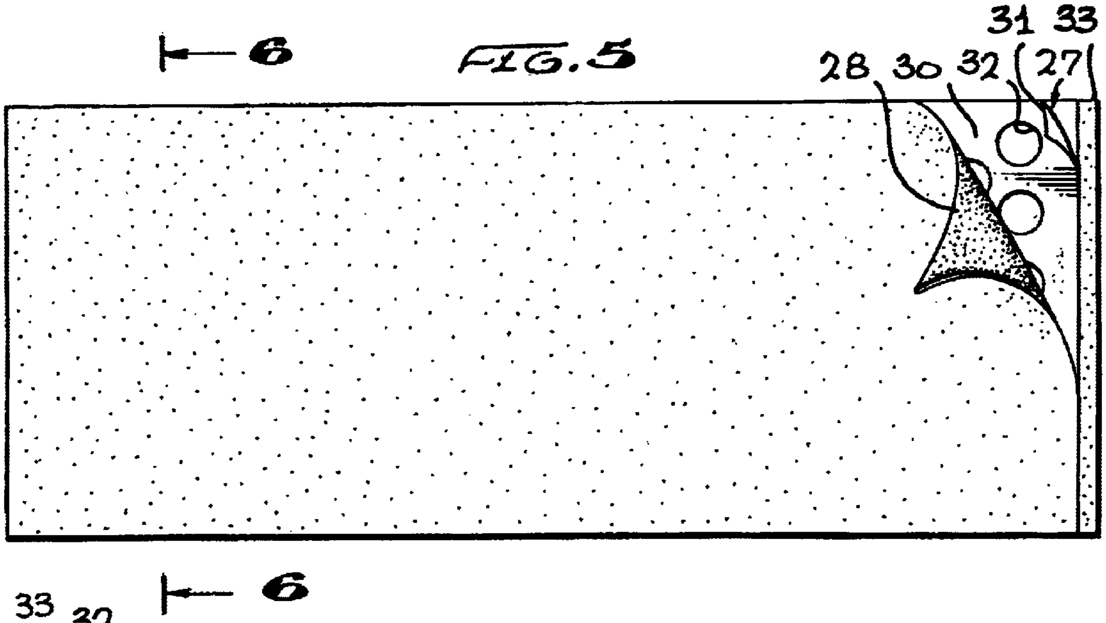
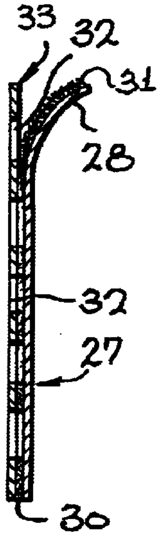
FIG. 6
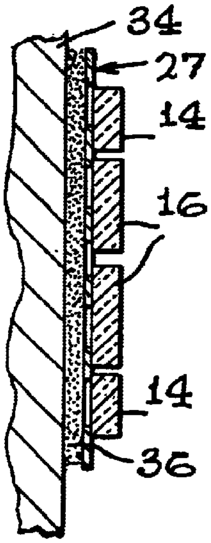
FIG. 7
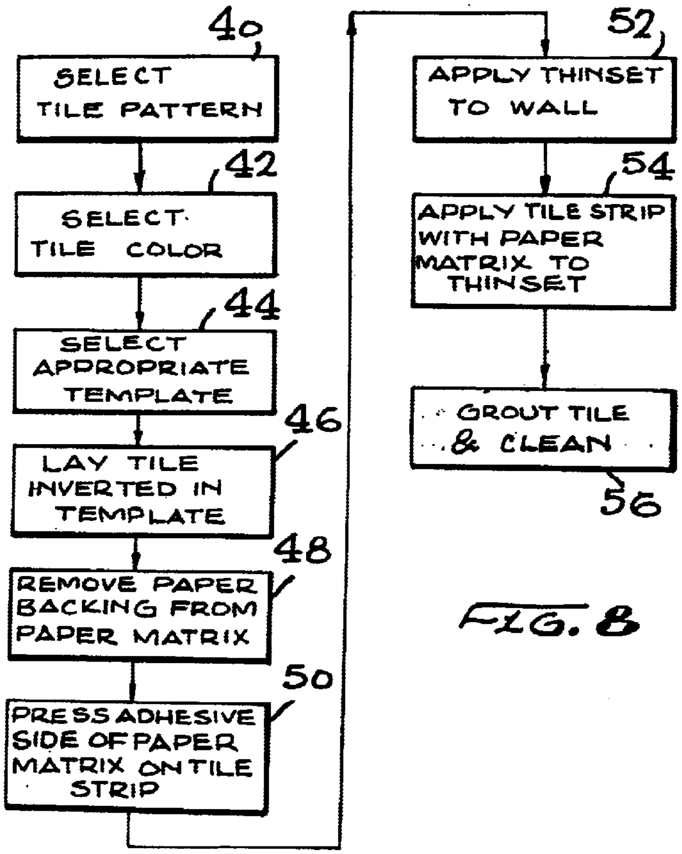
FIG. 8

PROCESS AND MATRIX FOR LAYING SMALL DECORATIVE TILE

BACKGROUND OF THE INVENTION

The proper laying of ceramic tile on walls and other surfaces requires a degree of skill and care to keep the tiles aligned and also at the proper height or elevation. Most such tiles are at least 4" by 4" or somewhat larger and are individually laid by hand on a cementitous base on the desired surface. When it is desired to lay a decorative strip of smaller tiles, the hand laying process becomes very tedious and time consuming because each little piece is laid on or against the base and must be carefully located as to elevation, spacing and orientation with other such small tiles as well as with the larger tiles forming the main part of the job. Such decorative strips could enhance many ceramic tile installations but for the great cost represented by the amount of time required to individually lay many such small tiles.

Some tile installers have used a paper or fabric backing to hold a pattern of tiles together but this has been done with the gluing as a separate step and requires waiting for the glue to dry before the tile assembly can be moved.

SUMMARY OF THE INVENTION

Applicant has found that the time involved in on site installation of strips of decorative tile including many small pieces can be substantially reduced through the use of a lightweight plastic matrix used in combination with a perforated paper matrix having adhesive on one side.

Many different designs can be incorporated into such plastic matrixes which are molded to form ridges separating and spacing the small decorative tiles. Through the use of the matrix, which may be, for example, one foot in length, a strip of prearranged decorative tile one foot in length is readily installed on the desired surface. In this way the task is made much faster and the results are, in general, better because of greater uniformity in spacing and alignment than is possible by hand laying.

A specific matrix giving rise to a particular decorative pattern is shown in this disclosure. This design uses a number of quite small triangular tiles, a number of small square tiles and also a number of small rectangular tiles all spaced from each other. These small tiles are placed face down in the spaces separated by the ridges in the matrix. Although the exact shape and size of tiles is dictated by the ridge locations, some pattern variation is permitted since arrangements of tiles varying by color are easily effected. Matrixes having different ridge patterns may be used to produce different designs; however, a single matrix such as that described herein can be used to provide a great variety of patterns with different colors of tiles of each shape.

An important part of the present invention involves the use of a paper matrix having adhesive on one side protected by a light weight peel off paper layer. The paper matrix preferably includes a main layer of paper having significant strength, a layer of very thin but tough plastic film having adhesive on both sides and a peel off paper layer. A very strong adhesive on one side of the plastic film secures the plastic film to the main paper layer. A somewhat less strong adhesive secures the peel off paper layer to the plastic film. The paper matrix as described is then perforated such that the holes are essentially evenly spaced, leaving a large proportion of the area (approximately half) of the paper matrix. When the tiles have been placed face down in the matrix in the desired pattern, the paper matrix, which, preferably, is approximately the area of the matrix, is selected and the peel off protective layer is peeled away from the paper matrix exposing an adhesive layer. The paper matrix is then secured to the exposed sides of the tiles, which are the back sides, thereby securing the tiles together in the desired spatial relationship. If necessary, the paper matrix is then trimmed to the area of the tile strip.

Thinset adhesive, also called mastic, is then applied to the surface where the tiles are to be attached. The tiles which are then secured to the paper matrix are removed from the matrix and are then attached to the wall or other surface by pressing the paper matrix and tile assembly against the thinset adhesive. The tile is thereby secured to the wall, or other surface, with the finish side facing outward and with the tile spacing just as established by the position of the tiles on the matrix. Several such tile strips may be assembled prior to attaching them to the desired surface. Grout is then applied to fill in the spaces between the tiles. Normally, several such matrix assemblies of tile will be fastened to the wall and then grout is applied to all at one time.

BRIEF DESCRIPTION OF THE DRAWING

This invention may be more clearly understood with the following detailed description and by reference to the drawings in which:

FIG. 4 is a sectional view taken along line 4—4 of FIG. 2;

FIG. 5 is a plan view of the paper matrix according to the invention with a portion of the peel off paper protective layer being peeled back to expose the adhesive surface of the paper matrix;

FIG. 6 is a sectional view along line 6—6 of FIG. 5;

FIG. 7 is a sectional view along line 7—7 of FIG. 1; and

FIG. 8 is a block diagram indicating the steps of the process of the invention.

DESCRIPTION OF THE PREFERRED EMBODIMENT

Figure 1:
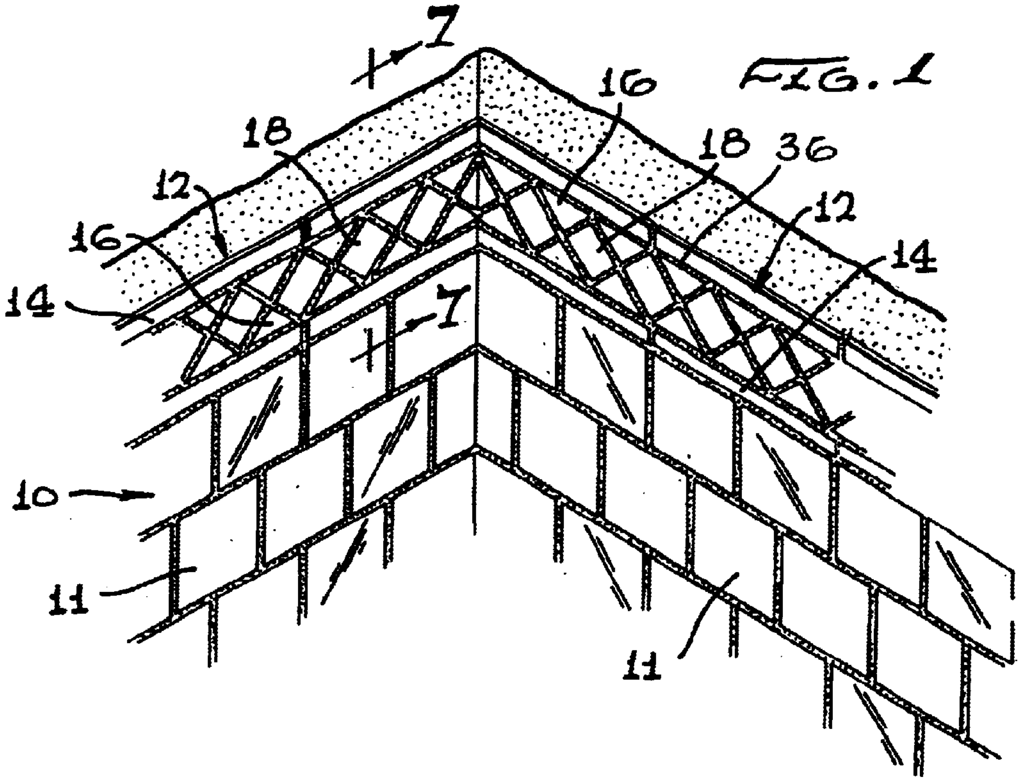
FIG. 1 is a view of a corner wall of a room with conventional ceramic tiles shown in combination with a row of decorative tiles which have been installed according to the invention.

FIG. 1 is a view of a corner wall 10 of a room, such as a bathroom with conventional ceramic tiles on the wall and with a row of decorative tiles which have been installed according to the invention. Three rows of conventional tiles 11 have been shown with a strip 12 of smaller decorative tiles installed as a top trim effect. It will be observed that the trim strip 12 consists of a series of somewhat elongated rectangular tiles 14 separated by small triangular tiles 16 and square tiles 18, the latter square tiles arranged in diamond configuration.

Figure 2:
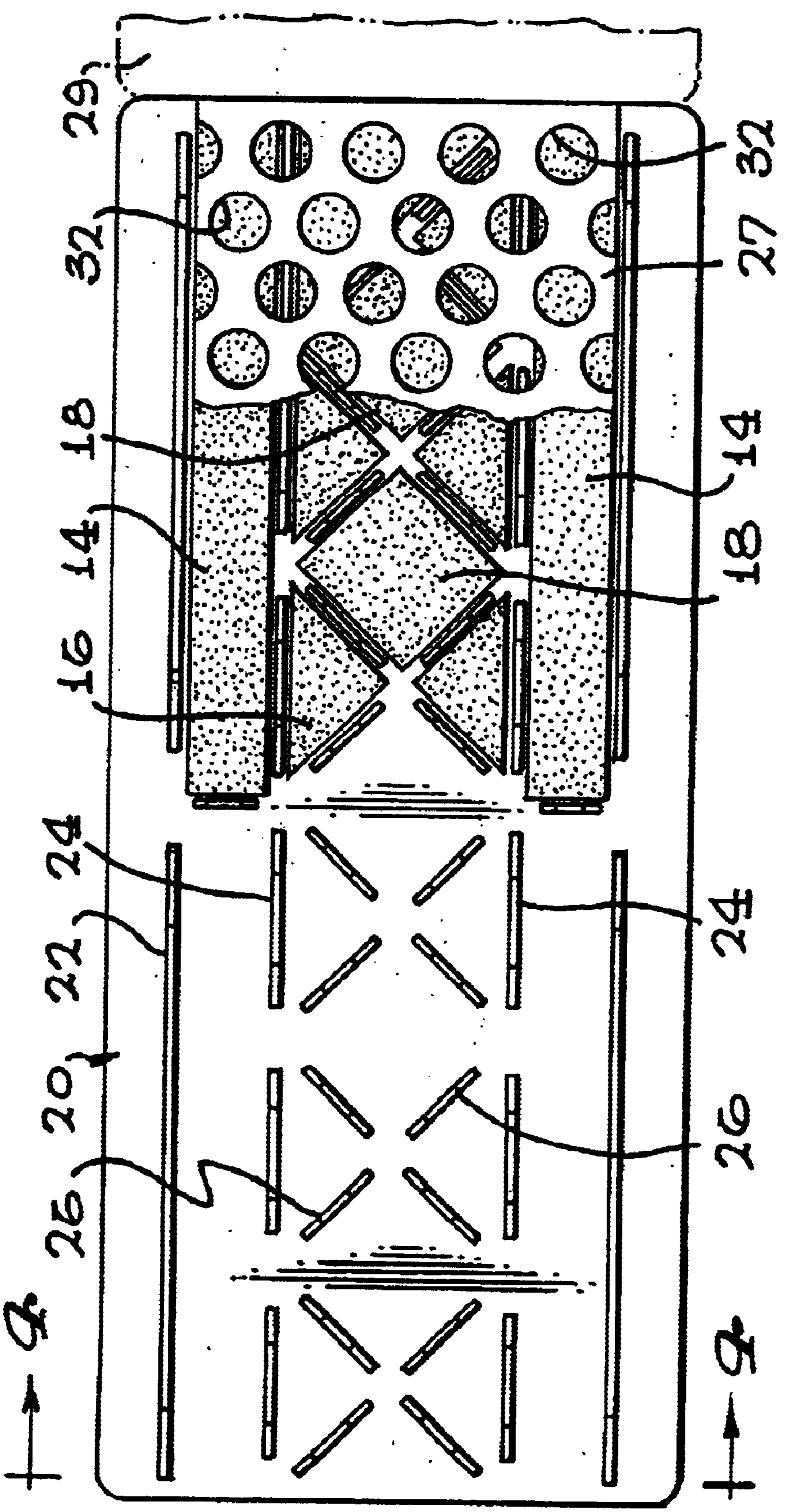
FIG. 2 is a plan view of the matrix according to the invention with tiles installed in some of the matrix spaces and with a sheet of the paper matrix shown broken away from some of the tiles.

To install the decorative strip(s) 12, a matrix 20, shown in FIG. 2, is employed which is of molded plastic having a degree of stiffness such that it can support the weight of tiles placed upon it. On the right side of the matrix 20 are shown the back sides of top and bottom rectangular tiles 14, the small triangular tiles 16 and the square tiles 18 which are placed face down against the matrix with each shape placed in the appropriate spaces between the several molded ridges 22, 24 and 26 of the matrix 20. Adhering to the back sides of the small tiles 14, 16 and 18 is a paper matrix 27, shown partly broken away, having many perforations 32 and which includes a plastic layer having an adhesive layer which holds the small tiles in the desired positions. The ridges in the matrix 20 must be located such that successive matrix panels may be laid end to end without interrupting the decorative tile pattern, as indicated by the adjacent matrix position 29 shown in phantom.

Figure 3:
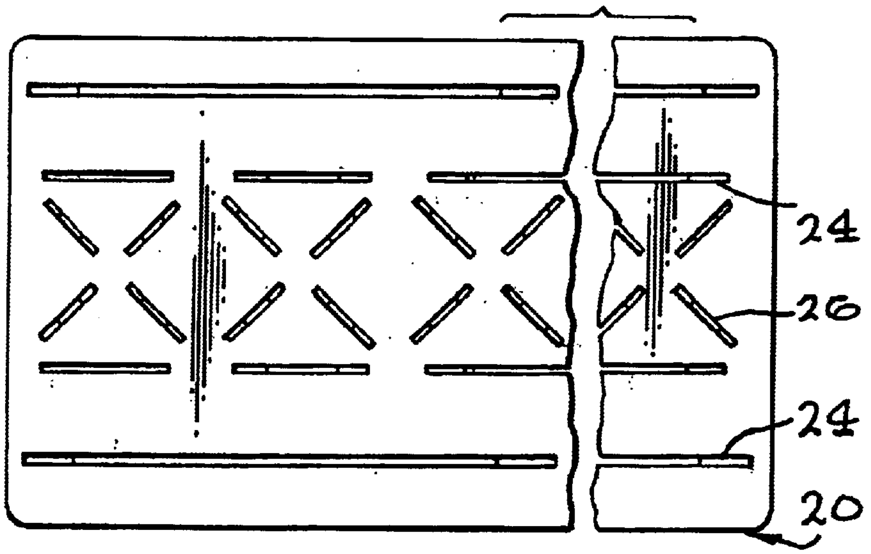
FIG. 3 is a plan view of a plastic matrix such as that shown in FIG. 2.

FIG. 3 is a plan view of the plastic matrix 20. It is shown broken to indicate that it may be of any desired length. As indicated above, the matrix is portable and hand holdable and it has been found that a length of about one foot is reasonably easy to handle when filled with tiles. This matrix is designed to secure a pattern of decorative small tiles such as that shown in FIG. 1. Similar matrixes may have differently arranged ridges to accommodate tiles of different configurations to make different patterns.

FIG. 4 is a cross-sectional view of the matrix 20 taken along line 4—4 of FIG. 2. Visible in this view are ridges 22 and 24 and diagonal ridges 26.

FIG. 5 is a plan view of the paper matrix 27 showing the main paper layer 33 and showing a peel away paper cover 28 partially removed to expose one side of the plastic film 31 carrying an adhesive layer 30.

FIG. 6 is a cross sectional view taken along line 6—6 of FIG. 5 and shows the main paper layer 33, a plastic film 31 with an adhesive layer 30 and the peel away paper cover 28. Some of the several holes 32 in paper matrix 27 are also shown. Plastic film 31 carries adhesive on both sides. On one side is a strong adhesive which secures the plastic film to the main paper layer 33. On the opposite side is a less strong adhesive which secures the peel away paper cover 28. When the peel away paper cover 28 is removed, the paper matrix is pressed against the back side of tiles securing it to the tiles thereby holding the tiles in the desired relative position for handling. A layer of thinset adhesive is placed on the surface and the tiles and the paper matrix are removed from the matrix with the back side of the tiles pressed against the surface leaving the desired pattern of tiles secured to the surface.

FIG. 7 shows a cross sectional view taken along line 7—7 of FIG. 1 which is a partial sectional drawing through wall 10. This view shows a wood wall stud 34 such as a 2"×4" stud to which is attached a layer of wallboard or sheetrock 36. The perforated paper matrix 27 carrying the small tiles 14, 16 and 18 is secured to the surface of the sheetrock 36 by means of thinset adhesive. The matrix 20 may then be reloaded with more of the small tiles 14, 16, and 18, another perforated paper matrix 27 is attached to the back side of the small tiles, thinset adhesive is applied to the next wall position and the tile and the paper matrix 27 again secured to wall 10. This may be repeated as desired to fill the space allotted for the decorative tile strip. Several such tile strips may be assembled and all then applied in succession to the wall. The spaces between the tiles are then filled with grout, the surface cleaned as required and the job is complete.

The above described process is set forth in detail in the block diagram, FIG. 8. The tile setter may have several tile patterns to choose from and one is selected as indicated in block 40. He will also select the desired tile colors (Block 42). The appropriate matrix is selected as indicated in block 44 and the tiles of the desired shape and colors are laid face down in the matrix (Block 46). A paper matrix member 27 is selected and the paper backing 28 is pulled away exposing the adhesive layer as shown in block 48, after which the paper matrix is pressed onto the tile strip in the matrix to secure the paper matrix to the tile strip (Block 50). Thinset adhesive is then applied to the wall (Block 52). The tile strip and paper matrix are pressed against the wall 10 (Block 54) causing the tile strip to adhere to the wall in the arrangement defined by the location of the small tiles in the matrix. Grout is then applied to fill in the spaces between the small tiles and the surface is cleaned (Block 56).

The above described embodiments of the present invention are merely descriptive of its principles and are not to be considered limiting. These skilled in the art will recognize certain possible modifications to the above described process. Obviously, it is useful as well for laying marble, tumbled marble, or even plastic tile. If a number of matrixes are available and these can be filled rapidly, a coating of thinset adhesive may be put on the wall at one time sufficient for several matrixes full of tile. Also, if the job is of considerable size, the paper matrix could be taken directly from a roll having a sticky side to press against the tile and a side which is not sticky (like cellophane tape) so that the peel away paper layer would not be required. The peel away layer could also be a plastic sheet. The purpose of the peel away layer is to protect the paper matrix when sold in stacks of individual sheets either from having the paper matrix sheets stick together or, particularly in the case of do-it-yourself workers, from permitting the adhesive to dry out over time.

What is claimed is:

1. A process for on site installation by a tile setter of small individual decorative tiles varying shapes and sizes on a surface in a desired pattern comprising the steps of:

a) selecting a desired pattern of tiles;

b) selecting tiles of the desired shape and color to produce said pattern;

c) selecting a portable hand holdable matrix having ridges to locate and space a strip of said tiles in the desired pattern, said matrix being of sufficient stiffness to support said strip of tiles for manual handling;

d) laying the files with the external sides downward against the surface of said matrix;

e) selecting a layer of perforated paper with adhesive material on its surface and securing the paper layer to the back side of the tiles to create a tile strip;

f) applying adhesive to said surface to be decorated;

g) placing said tile strip against the adhesive on said surface to be decorated to secure said tile strip to said surface; and h) applying grout to the spaces between said tiles.

2. A process as claimed in claim 1 wherein a series of steps a) through g) are completed to provide an elongated strip of said tiles on said surface to be decorated; and grout is applied in the spaces between the tiles in said elongated strip.

3. A process as claimed in claim 1 wherein said matrix comprises a sheet of molded plastic material.

4. A process as claimed in claim 1 wherein said pattern of small individual tiles of varying shapes and sizes includes some tiles which are triangular and some which are elongated rectangular and said portable hand held matrix includes ridges placed at an angle relative to other ridges to secure said tiles in position.

5. A process for on site installation by a tile setter of small individual decorative tiles of varying sizes and shapes on a surface in a desired pattern comprising the steps of:

a) selecting a portable hand holdable matrix having ridges to locate and space a strip of tiles in the desired pattern said matrix being of sufficient stiffness to support said strip of tiles for manual handling;

b) placing tiles of the desired shape and color face down in said matrix;

c) securing a layer of perforated paper having adhesive material on the backside of said tiles to create a tile strip;

d) applying adhesive to said surface to be decorated;

e) removing said tile strip with the paper layer from said matrix and placing the tile strip against said surface to be decorated; and f) applying grout to the spaces between said tiles.

6. A process as claimed in claim 5 where a series of steps a) through e) are completed to provide an elongated strip of said tiles on said surface to be decorated and grout is then applied to the tiles in said elongated strip.

7. A process as claimed in claim 5 wherein said small, individual, decorative tiles of varying sizes and shapes includes tiles which are triangular and said portable hand holdable matrix includes ridges placed at an angle relative to other ridges to secure said triangular tiles in position.

8. A process as claimed in claim 7 wherein said ridges are spaced to permit tiles in successive matrixes to be laid end-to-end while maintaining the desired tile pattern.

9. A process as claimed in claim 5 wherein step e) further comprises providing a protective sheet over said adhesive material to protect said adhesive material during storage and when said tiles are to be applied to said surface to be decorated, peeling said protective layer off said adhesive material.

* * * * *